United States Patent
Farkas et al.

(10) Patent No.: US 7,307,243 B2
(45) Date of Patent: Dec. 11, 2007

(54) DYNAMIC RADIANT FOOD PREPARATION METHODS AND SYSTEMS

(75) Inventors: Brian Farkas, Raleigh, NC (US); Brian Lloyd, Raleigh, NC (US); Kevin Keener, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 612 days.

(21) Appl. No.: 10/840,075

(22) Filed: May 6, 2004

(65) Prior Publication Data

US 2004/0250688 A1 Dec. 16, 2004

Related U.S. Application Data

(60) Provisional application No. 60/469,495, filed on May 9, 2003.

(51) Int. Cl.
*A21B 1/14* (2006.01)
*A21B 1/22* (2006.01)
*A21B 1/48* (2006.01)
*F27B 9/36* (2006.01)

(52) U.S. Cl. ............... 219/388; 219/404; 219/411; 99/443 C; 426/243

(58) Field of Classification Search ............ None
See application file for complete search history.

(56) References Cited

U.S. PATENT DOCUMENTS

| 2,340,354 A | 2/1944 | Wells |
| 3,119,355 A | 1/1964 | Gawlitza et al. |
| 3,249,741 A * | 5/1966 | Mills ............... 219/388 |
| 3,559,564 A | 2/1971 | Turner et al. ......... 99/332 |

(Continued)

FOREIGN PATENT DOCUMENTS

WO    WO 99/11992    3/1999

(Continued)

OTHER PUBLICATIONS

International Search Report for PCT/US2004/014329; mailed Dec. 8, 2004.

(Continued)

*Primary Examiner*—J. Pelham
(74) *Attorney, Agent, or Firm*—Myers Bigel Sibley & Sajovec, P.A.

(57) ABSTRACT

A continuous oven for heating a food product having an outer surface and an interior includes an enclosure with a first heating zone and a second heating zone. A conveyor is configured to convey the product from the first heating zone to the second heating zone. At least one surface-browning infrared emitter is adjacent the first heating zone of the conveyor and is configured to provide a first electromagnetic radiation profile to the product in the first heating zone that is adapted to evaporate surface moisture to produce a crust matrix on the outer surface of the product. At least one interior-heating infrared emitter is adjacent the second heating zone of the conveyor and is configured to provide a second electromagnetic radiation profile to the product in the second heating zone that is different from the first electromagnetic radiation profile. The second electromagnetic radiation profile is adapted to heat the interior of the product. This configuration can produce food products that have characteristics approximating immersion-fried food products.

39 Claims, 11 Drawing Sheets

U.S. PATENT DOCUMENTS

| | | | |
|---|---|---|---|
| 4,363,955 A | 12/1982 | Gauthier et al. | |
| 4,421,015 A | 12/1983 | Masters et al. | |
| 4,565,704 A * | 1/1986 | Dagerskog et al. | 426/233 |
| 4,575,616 A * | 3/1986 | Bergendal | 219/405 |
| 4,636,618 A | 1/1987 | Jenicot | 219/441 |
| 4,756,916 A * | 7/1988 | Dreher et al. | 426/302 |
| 5,049,711 A * | 9/1991 | August | 219/680 |
| 5,202,139 A | 4/1993 | Gaon et al. | 426/242 |
| 5,223,290 A | 6/1993 | Alden | 426/243 |
| 5,382,441 A * | 1/1995 | Lentz et al. | 426/241 |
| 5,431,944 A * | 7/1995 | Melvej | 426/552 |
| 5,517,005 A | 5/1996 | Westerberg et al. | 219/685 |
| 5,556,000 A | 9/1996 | Covington et al. | 221/150 A |
| 5,567,459 A | 10/1996 | Gonzalez-Hernandez et al. | 426/237 |
| 5,665,259 A | 9/1997 | Westerberg | 219/411 |
| 5,721,805 A | 2/1998 | Cook et al. | 392/411 |
| 5,780,815 A | 7/1998 | Mestnik et al. | 219/400 |
| 5,786,569 A | 7/1998 | Westerberg | 219/411 |
| 5,814,468 A | 9/1998 | Siiman et al. | 435/7.21 |
| 5,816,138 A * | 10/1998 | Benson et al. | 99/355 |
| 5,910,264 A | 6/1999 | Dauliach | 219/411 |
| 5,942,142 A | 8/1999 | Forney et al. | 219/388 |
| 5,990,454 A | 11/1999 | Westerberg et al. | 219/411 |
| 5,997,938 A | 12/1999 | Taylor et al. | 426/637 |
| 6,069,345 A | 5/2000 | Westerberg | 219/411 |
| 6,079,319 A | 6/2000 | Doria | 99/331 |
| 6,132,785 A | 10/2000 | Collinge et al. | 426/302 |
| 6,369,360 B1 | 4/2002 | Cook | 219/388 |
| 6,417,494 B1 * | 7/2002 | Westerberg et al. | 219/402 |
| 6,915,734 B2 * | 7/2005 | Torghele et al. | 99/348 |
| 2003/0146202 A1 | 8/2003 | Backer et al. | 219/405 |
| 2004/0250688 A1 * | 12/2004 | Farkas et al. | 99/386 |

FOREIGN PATENT DOCUMENTS

| | | |
|---|---|---|
| WO | WO 01/58269 | 8/2002 |

OTHER PUBLICATIONS

Dagerskog, *Infra-Red Radiation for Food Processing I.A. Study of the Fundamental Properties of Infra-Red Radiation*, 1979, pp. 237-257, vol. 12, The Swedish Food Institute.

Farkas, et al., *Characterization of Radiant Emitters Used in Food Processing*, 2003, pp. 1-13, vol. 38, International Microwave Power Institute.

Farkas, et al., *Development of a Radiant Heating Process to Mimic Immersion Frying*, 2003, pp. 1-6, vol. 9, International Conference Engineering and Food.

Farkas, et al., *Analysis of Convective Heat Transfer During Immersion Frying*, 2000, pp. 1269-1285, vol. 18(6), Drying Technology.

Hubbard, et al., *A Method For Determining The Convective Heat Transfer Coefficient During Immersion Frying*, Jan. 14, 1999, pp. 200-215, vol. 22, Journal of Food Processing Engineering.

Hubbard, et al. *Influence Of Oil Temperature On Convective Heat Transfer During Immersion Frying*, Aug. 11, 1999, pp. 142-163, vol. 24, Journal of Food Processing Preservation.

Wahlby, et al. *Reheating characteristics of crust formed on buns, and crust formation*, Sep. 3, 2001, pp. 177-184, vol. 53, Journal of Food Engineering.

Weaver, et al., *Infrared processing Improves quality of frozen French-Fried Potatoes*, 1970, pp. 66-72, vol. 24, Food Technology.

\* cited by examiner

DYNAMIC RADIANT FOOD PREPARATION METHODS AND SYSTEMS

RELATED APPLICATIONS

This application claims priority to U.S. Patent Application No. 60/469,495, filed May 9, 2003, the disclosure of which is incorporated herein by reference in its entirety.

FIELD OF THE INVENTION

The present invention relates generally to the preparation of food and, more particularly, to radiant food preparation methods and systems.

BACKGROUND OF THE INVENTION

Deep fat frying, or immersion frying, results in food products that typically have a fried, crusty exterior that is generally pleasing to consumers. However, such food products may be high in fat content. Cooking such foods also presents difficulties in commercial establishments. The quality of the oil tends to decrease with use, which leads to inconsistent food product quality, and changing the oil frequently can be expensive. The hot oil from immersion fryers may also contribute to worker accidents, such as burns from spattered or spilled hot oil. Immersion frying may also take several minutes to cook a product, which may be slower than desired in some settings, such as made-to-order or fast food restaurants.

Cooking food using other methods generally does not result in a food product having the same qualities as immersion-fried food. Conduction and convection ovens are relatively slow cooking methods that do not generally provide the same quality of crusty exterior that is characteristic of immersion-fried foods. Microwave radiation heats the food product very quickly, but the food product is often soggy with very little surface browning.

SUMMARY

According to embodiments of the present invention, a continuous oven for dynamically heating a food product having an outer surface and an interior is provided having an enclosure with a first heating zone and a second heating zone. A conveyor is configured to convey the product from the first heating zone to the second heating zone. At least one surface-browning infrared emitter is adjacent the first heating zone of the conveyor and is configured to provide a first electromagnetic radiation profile to the product in the first heating zone that is adapted to evaporate surface moisture to produce a crust matrix on the outer surface of the product. At least one interior-heating infrared emitter is adjacent the second heating zone of the conveyor and is configured to provide a second electromagnetic radiation profile to the product in the second heating zone that is different from the first electromagnetic radiation profile. The second electromagnetic radiation profile is adapted to heat the interior of the product. This configuration can provide dynamic radiation to a food product such that the processed product can have characteristics approximating immersion-fried food products, for example, with a crispy exterior surface.

In particular embodiments, the first electromagnetic radiation profile provides a greater heat flux to the product than the second electromagnetic radiation profile. The surface-browning infrared emitter can include a plurality of spaced apart surface-browning infrared emitters, and the interior-heating infrared emitter can include a plurality of spaced apart interior-heating infrared emitters. A first distance between each one of the plurality of surface-browning infrared emitters and the conveyor can be generally less than a second distance between each one of the plurality of interior-heating infrared emitters and the conveyor. The distance between successive ones of the plurality of surface-browning infrared emitters can be generally shorter than the distance between successive ones of the plurality of interior-heating infrared emitters. The oven can include an electromagnetic radiation profile controller configured to control a power level for the surface-browning infrared emitter and the interior-heating infrared emitter such that the power level of the surface-browning emitter is greater than the power level of the interior-heating emitter. The surface-browning infrared emitter and the interior-heating infrared emitter can include a first set of infrared emitters on one side of the conveyor and a second set of emitters on an opposing side of the conveyor. The first electromagnetic radiation profile can have a greater intensity than the second electromagnetic radiation profile.

The surface-browning infrared emitter and the interior-heating infrared emitter can include quartz halogen emitters. The surface-browning infrared emitter and the interior-heating infrared emitter may also emit electromagnetic radiation in the visible to infrared wavelength range. The surface-browning infrared emitter and the interior-heating infrared emitter can emit electromagnetic radiation having a wavelength from between about 0.4 µm to about 300 µm. The first electromagnetic radiation profile can include generally longer wavelengths than the second electromagnetic radiation profile.

In some embodiments, the surface-browning infrared emitter and the interior-heating infrared emitter comprise a plurality of spaced apart infrared emitters, and wherein the electromagnetic radiation from successive ones of the plurality of infrared emitters generally decreases in wavelength. The surface-browning infrared emitter and the interior-heating infrared emitter can include a plurality of spaced apart infrared emitters such that the plurality of infrared emitters are configured to approximate a heat flux transfer as the product is transferred from the first heating zone to the second heating zone of the conveyor that approximates heat flux during immersion frying. The surface-browning infrared emitter can be configured to provide a heat flux to the product in the first heating zone of the conveyor that increases to above about 1.5 W/cm$^2$.

In some embodiments, the oven includes a controller configured to control the speed of the conveyor. A distance between the surface-browning infrared emitter or the interior heating emitter and the conveyor can be between about 1.5 inches and about 3.0 inches. The distances may be adjusted depending on the size of the product and the desired heat flux.

According to further embodiments of the present invention, methods of dynamically heating a food product in an oven are provided. The product includes an exterior surface and an interior. The product is exposed to radiation having a first electromagnetic radiation profile adapted to produce a crust matrix on the surface of the product. The product is then exposed to radiation having a second electromagnetic radiation profile that is different from the first electromagnetic radiation profile and adapted to heat the interior of the product.

In particular embodiments, the first electromagnetic radiation profile has an intensity that is greater than the second electromagnetic radiation profile. The first electromagnetic radiation profile can provide a heat flux to the product that is greater than about 1.5 W/cm² to provide a crust matrix on the surface of the product. The first electromagnetic radiation profile can include longer wavelength radiation than the second electromagnetic radiation profile. The first electromagnetic radiation profile can include radiation having a wavelength between about 1.4 and 100 μm. The second electromagnetic radiation profile can include radiation having a wavelength between about 0.4 and 1.4 μm. The first electromagnetic radiation profile and the second electromagnetic radiation profile can together approximate an immersion frying heat flux.

In some embodiments, the heat flux to the product during immersion frying can be measured. The first and the second electromagnetic radiation profile can be selected based on the measured heat flux to the product during immersion frying.

In some embodiments, exposing the product to the first electromagnetic radiation profile includes exposing the product to a quartz halogen emitter. Exposing the product to the first electromagnetic radiation profile can have a duration of less than about 300 seconds. The product can be conveyed on a continuously advancing conveyor to expose the product to the first electromagnetic radiation profile and the second electromagnetic radiation profile. The product can be placed on a conveyor, and the oven can include a plurality of infrared emitters configured to produce a variable heat flux at successive points along the conveyor. The variable heat flux can increase to above about 2.5 W/cm² for a duration of less than about 50 seconds.

In some embodiments, exposing the product to the first electromagnetic radiation profile and exposing the product to the second electromagnetic radiation profile are carried out in a batch process.

The product before exposure to electromagnetic radiation can be a par-fried potato piece, a raw potato piece having oil on the surface, a fried or par-fired breaded muscle tissue product, and/or a fried or par-fried yeast-risen or cake doughnut.

According to still further embodiments of the present invention an oven for dynamically heating a food product is provided. The product includes an exterior surface and an interior. The oven includes at least one infrared emitter and a heating zone adjacent the infrared emitter. The infrared emitter is configured to emit electromagnetic radiation in the heating zone. A controller is in communication with the infrared emitter and configured to control the electromagnetic radiation from the infrared emitter to provide a first electromagnetic radiation profile adapted to produce a crust matrix on the surface of the product and then to provide a second electromagnetic radiation profile that is different from the first electromagnetic radiation profile and adapted to heat an interior of the product.

In particular embodiments, the controller includes a positioning portion connected to the infrared emitter. The positioning portion is configured to move the infrared emitter with respect to the heating zone. The controller can be configured to move the infrared emitter to a first position to provide the first electromagnetic radiation profile and to a second position to provide the second electromagnetic radiation profile. The controller can be configured to increase a power level to the infrared emitter to provide the first electromagnetic radiation profile and to decrease the power level to the infrared emitter to provide the second electromagnetic radiation profile. In other embodiments, the infrared emitter is stationary.

DETAILED DESCRIPTION OF EMBODIMENTS OF THE INVENTION

Figure 1:
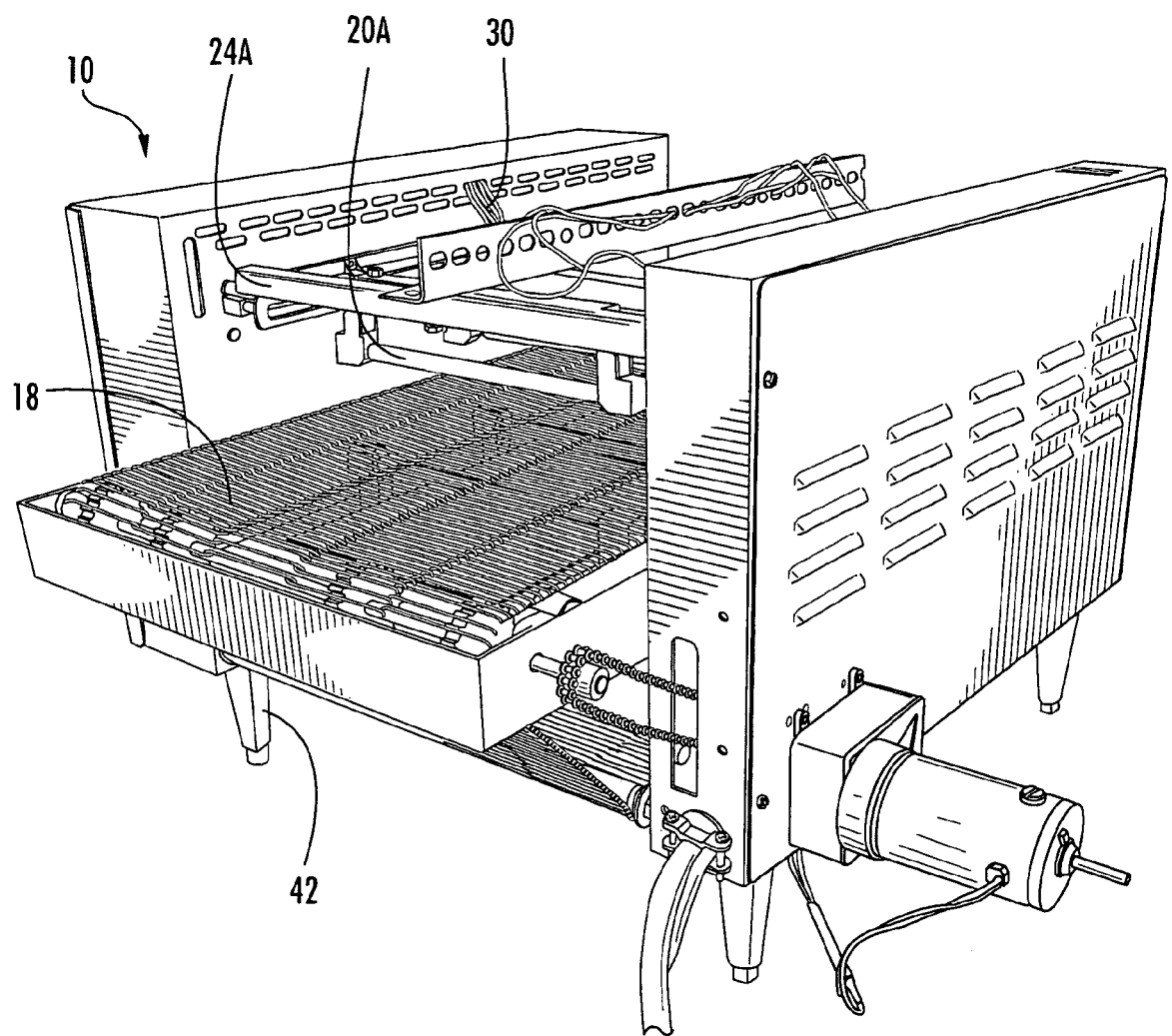
FIG. 1 is a perspective view of a continuous oven according to embodiments of the present invention with an exterior cover removed.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Thicknesses and dimensions of some components may not be drawn to scale and may be exaggerated for clarity.

The present invention is directed to food preparation using dynamic radiant heating. A continuous oven 10 according to embodiments of the present invention is shown in FIGS. 1-4. The oven 10 includes an enclosure 12 with an opening 28 and two heating zones 14A, 14B. A conveyor 18 transports a food product 26 through the heating zone 14A and the heating zone 14B. Upper 5 surface-browning emitters 20A-20C are positioned above the food product 26 and lower surface-browning emitters 20D-20F are positioned below the food product in the heating zone 14A. Upper interior-heating emitters 22A-22B and lower interior-heating emitters 22C-22D are positioned above and below the heating zones 14A, 14B, respectively. The emitters 20A-20F and 22A-22D are held in place by emitter racks 24A-24B and powered through electrical connections 30. The emitter racks 24A-24B include reflectors 16A-16B to reflect radiation from the emitters 20A-20F and 22A-22D toward the food product 26 on the conveyor 18.

Figure 4:
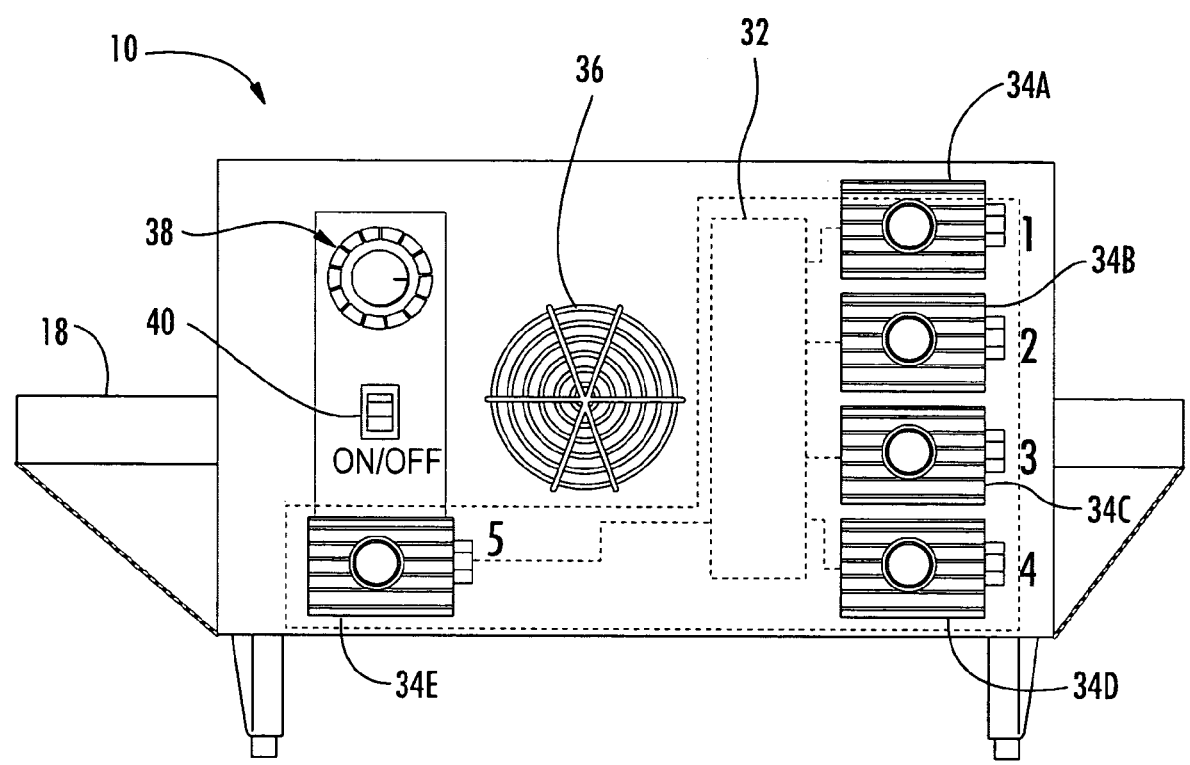
FIG. 4 is a side view of the oven of FIG. 1 illustrating a control panel according to embodiments of the present invention.

As illustrated in FIG. 4, a central controller 32 controls the operation of various emitter controllers 34A-34E. In some embodiments, the central controller 32 is omitted, and/or the emitter controllers 34A-34E are controlled manually. An exhaust fan 36 circulates air through the enclosure 12. Legs 42 (FIG. 2) support the oven 10 and allow heat dissipation from the lower portion of the enclosure 12. A conveyor controller 38 controls the speed of the conveyor 18, and an on/off switch 40 activates the conveyor 18.

Radiant electromagnetic energy is used to provide a dynamic electromagnetic radiation profile to the food product 26 at a wavelength and penetration depth such that the resulting product may have characteristics similar to that of immersion-fried food products. The crust matrix exterior and heated interior of the food product 26 can be obtained without requiring additional fat, such as with immersion frying processes. Moreover, cooking times may be reduced and the consistency of the quality of the resulting food product may be improved.

In operation, the emitters 20A-20F and 22A-22D emit electromagnetic radiation having an electromagnetic radiation profile to the food product 26 as the food product 26 is transported through the heating zones 14A, 14B. As used herein, an "electromagnetic radiation profile" refers to various characteristics of the radiation, including but not limited to intensity, wavelength, spectral distribution, and/or heat flux at a position (such as the surface of a food product). Although the oven 10 is illustrated with respect to two heating zones 14A, 14B, it should be understood that the electromagnetic radiation profiles in the respective heating zones 14A, 14B can be continuous between the heating zones 14A, 14B. The heating zones 14A, 14B can be used to provide a variable electromagnetic radiation profile to the product 26 to approximate the immersion frying process. It should also be understood that the oven 10 may include additional heating zones, for example, to preheat the product 26 prior to exposure to the surface-browning emitters 20A-20F using either infrared emitters or other heating or defrosting techniques, such as microwave or conventional ovens. The heat flux provided by preheating infrared emitters can be lower that the heat flux of the surface-browning emitters 20A-20F, for example, 1.0 W/cm$^2$ to 0.1 W/cm$^2$ or less.

Figure 7:
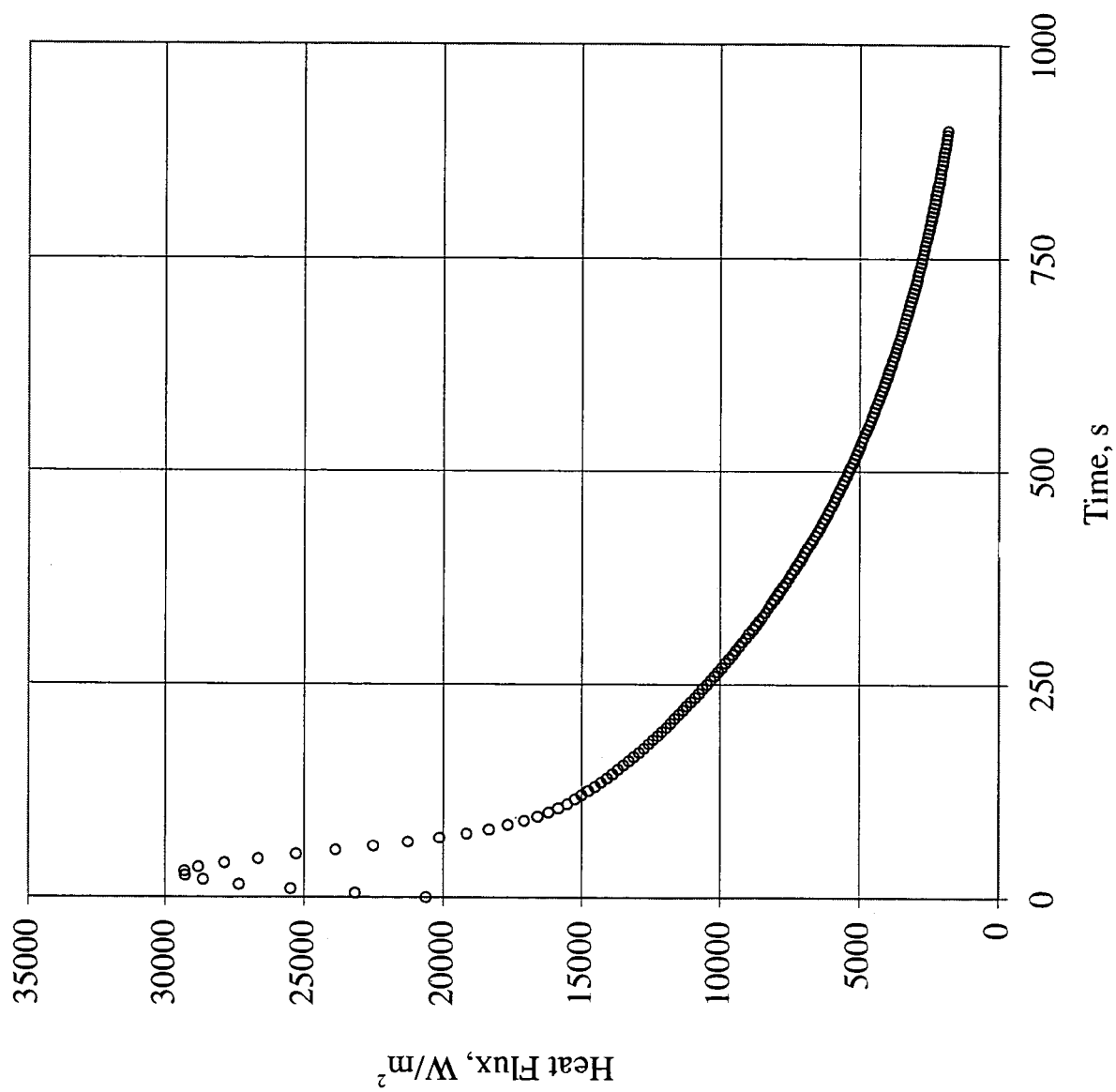
FIG. 7 is a graph of the heat flux as a function of time during the immersion frying of potato cylinders at 180° C.

As illustrated in FIGS. 1-4, the oven 10 is configured such that the surface-browning emitters 20A-20F provide an electromagnetic radiation profile to the product 26 that is different from the electromagnetic radiation profile provide by the interior-heating emitters 22A-22D. More specifically, the electromagnetic radiation profile provided to the product 26 by the surface-browning emitters 20A-20F is adapted to evaporate surface moisture to produce a crust matrix on the outer surface of the product. As used herein, the "surface" can include a three-dimensional surface region having a thickness of a few millimeters to a centimeter or more, and can include the entire crust region after a crust matrix is formed. Next, the electromagnetic radiation profile provided to the product 26 by the interior-heating emitters 22A-22D is adapted to heat the interior of the product. For example, the spacing, placements, power levels, wavelengths, and/or spectral profiles of the emitters 20A-20F and 22A-22D can be selected to provide a longer wavelength and/or more intense radiation profile for surface heating and moisture evaporation in the heating zone 14A and a shorter wavelength and/or less intense radiation profile for interior product heating in the heating zone 14B;

Without wishing to be bound by any particular theory, electromagnetic radiation profiles can be selected to approximate the heat flux in an immersion frying process. For example, FIG. 7 illustrates the heat flux during immersion frying of potato cylinders at 180° C. as a function of time. As illustrated in FIG. 7, immersion frying processes are generally characterized by a substantial increase in heat flux when a food product is immersed in oil followed by a declining heat flux. The crust matrix that is characteristic of fried foods is generally formed during the initial period of substantially increased heat flux. Thus, the electromagnetic radiation profiles can be selected to approximate the initial increase in heat flux followed by a declining heat flux that is generally characteristic of immersion frying. Moreover, the penetration depth of the radiation and/or heat flux can be selected to enhance certain results. For example, a crust matrix may be formed by relatively long wave radiation, which does not penetrate significantly into the surface. Subsequently, a shorter wave radiation may be applied, which generally penetrates more deeply into a food product to aid in cooking and/or heating the interior.

Figure 2:
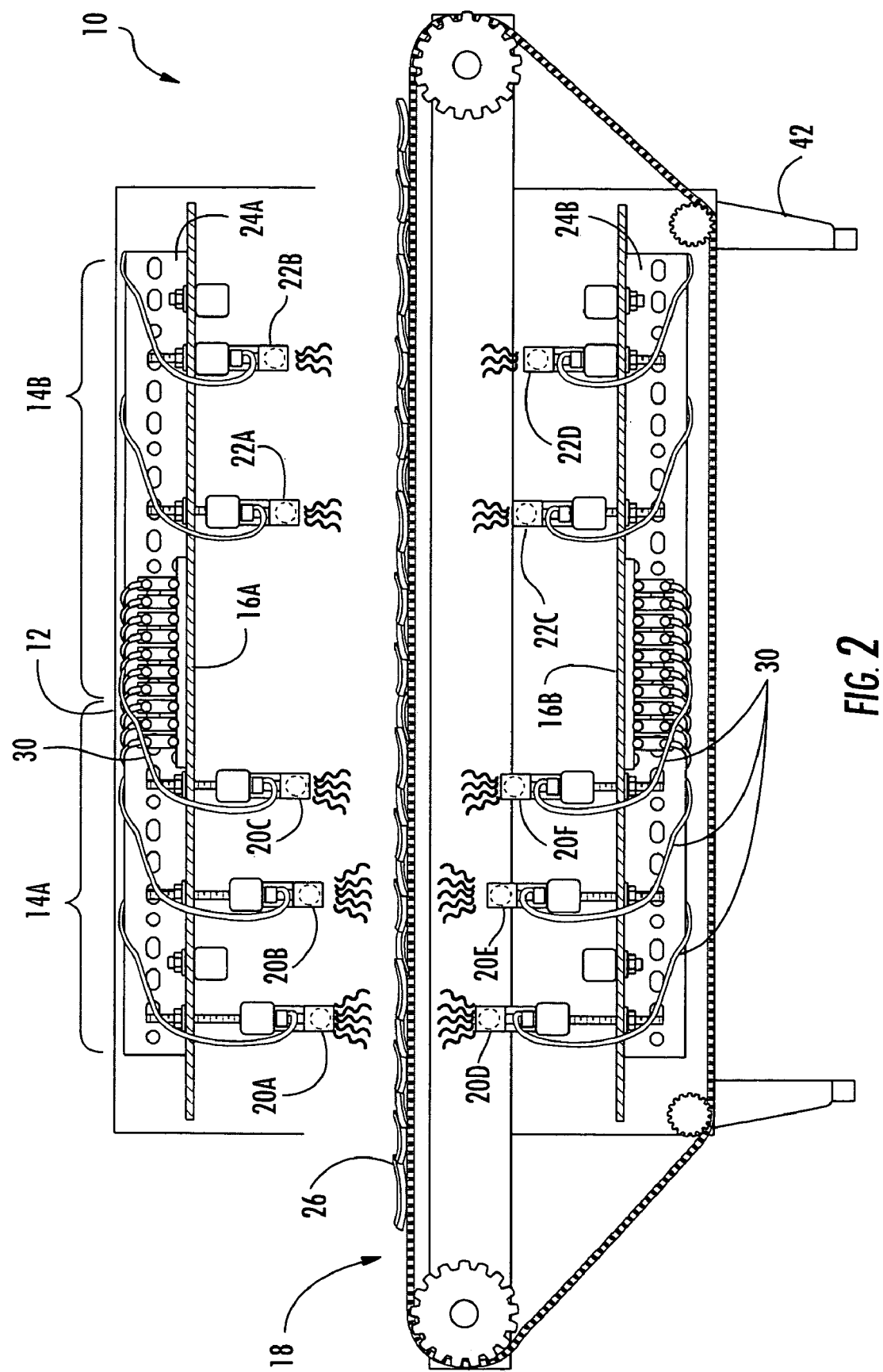
FIG. 2 is a cross-sectional side view of the oven of FIG. 1.
Figure 3:
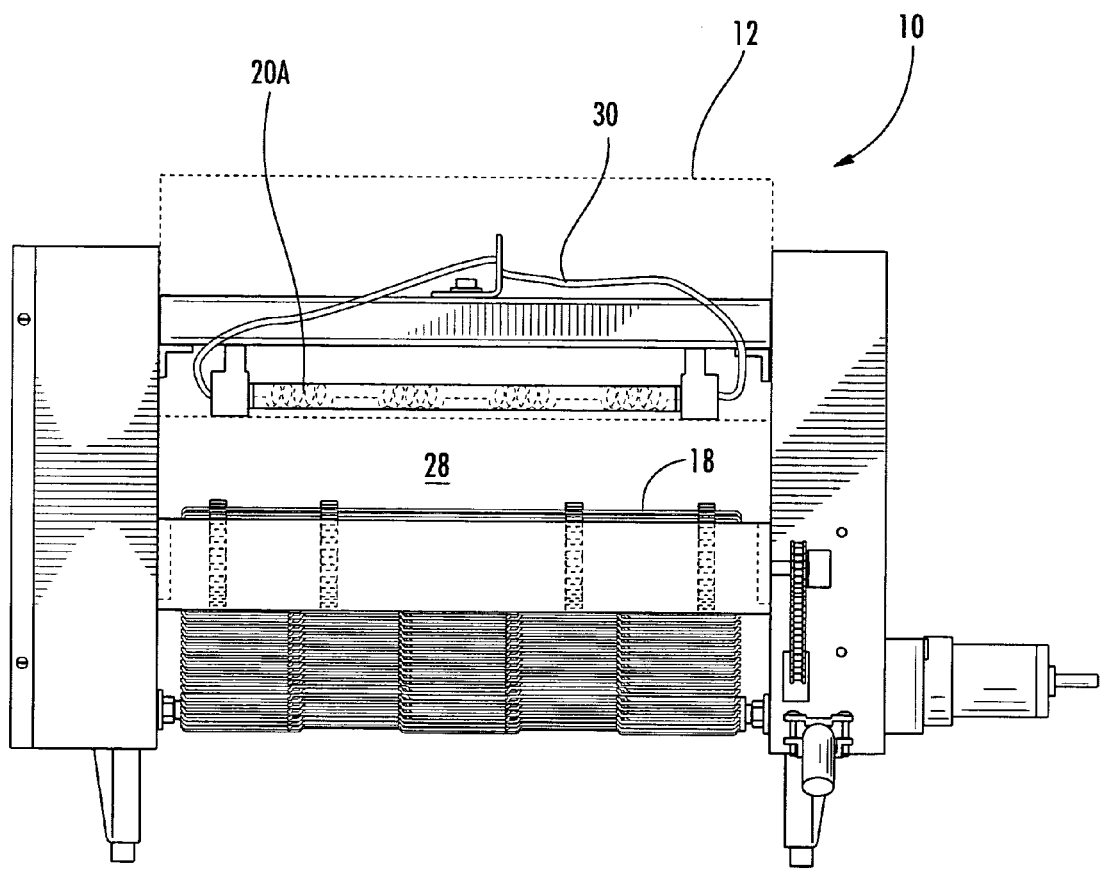
FIG. 3 is a front view of the oven of FIG. 1.

Various emitter configurations and/or power operation levels can be used to provide electromagnetic radiation profiles according to embodiments of the present invention. As illustrated in FIG. 2, the distance between successive ones of the interior-heating emitters 22A-22F is generally greater as compared with the distance between successive ones of the surface-browning emitters 20A-20F. In addition, the distance between the interior-heating emitters 22A-22D and the conveyor 18 is generally greater than the distance between the surface-browning emitters 20A-20F and the conveyor 18. In this configuration, when the emitters 20A-20F and 22A-22D are operated at the same power level, the electromagnetic radiation profile incident on the food product 26 in the heating zone 14A is more intense than the electromagnetic radiation profile in the heating zone 14B. Thus, surface moisture is evaporated from the food product 26 in the heating zone 14A and interior heating occurs in the heating zone 14B. The emitters 20A-20F and 22A-22D can be operated at different power levels having different spectral distributions. For example, in some embodiments, the surface-browning emitters 20A-20F emit longer wavelength radiation than the interior-heating emitters 22A-22D. The longer wavelength radiation does not penetrate as deeply into the food product 26 and, therefore, concentrates heat flux on the surface of the food product 26. In other embodiments, the spectral distribution of the surface-browning emitters 20A-20F is approximately the same as the spectral distribution of the interior-heating emitters 22A-22D, and a variable heat flux can be provided to the product 26 due to the spacing of the surface-browning emitters 20A-20F (i.e., relatively closer to the product 26 and/or closer to adjacent emitters) and the interior-heating emitters 22A-22D (i.e., relatively farther from the product 26 and/or farther apart from adjacent emitters).

In operation, after an initial rapid increase in heat flux near the front end of the conveyor in the heating zone 14A, the heat flux and/or intensity of the electromagnetic radiation generally decreases as the food product 26 travels along the conveyor 18. As discussed above, the decreasing heat flux and/or intensity may be a result of the placement of the emitters 20A-20F and 22A-22D. However, the decreasing heat flux and/or intensity and may include intervening or intermittent increases in heat flux and/or intensity, such as when the food product 26 is directly in-line with one of the emitters 20A-20F and 22A-22D.

The heat flux incident on the product 26 decreases as the distance between the emitters 20A-20F and 22A-22D and the product 26 increases. Distances between the emitters 20A-20F and 22A-22D can be uneven and/or range from between a fraction of a centimeter to about 10, 20, 50 or 100 cm. For example, the heat flux when the product 26 is near emitters 20A-20F and 22A-22D in the heating zone 14A can increase to above about 2.5 W/cm² or 3.0 W/cm² or 10 W/cm² or more. As the product travels past emitters 20A-20F and 22A-22D, the heat flux generally decreases due, for example, to the increased distance between emitters 22A-22D and the product 26. Other parameters may be used to decrease the heat flux to the product 26 along the conveyor 18, such as decreasing the power, increasing the distance between the emitters 20A-20F and 22A-22D and the belt 18, and/or adjusting the speed of the conveyor 18. Filters can also be used to control the heat flux to the product 26.

Figure 8:
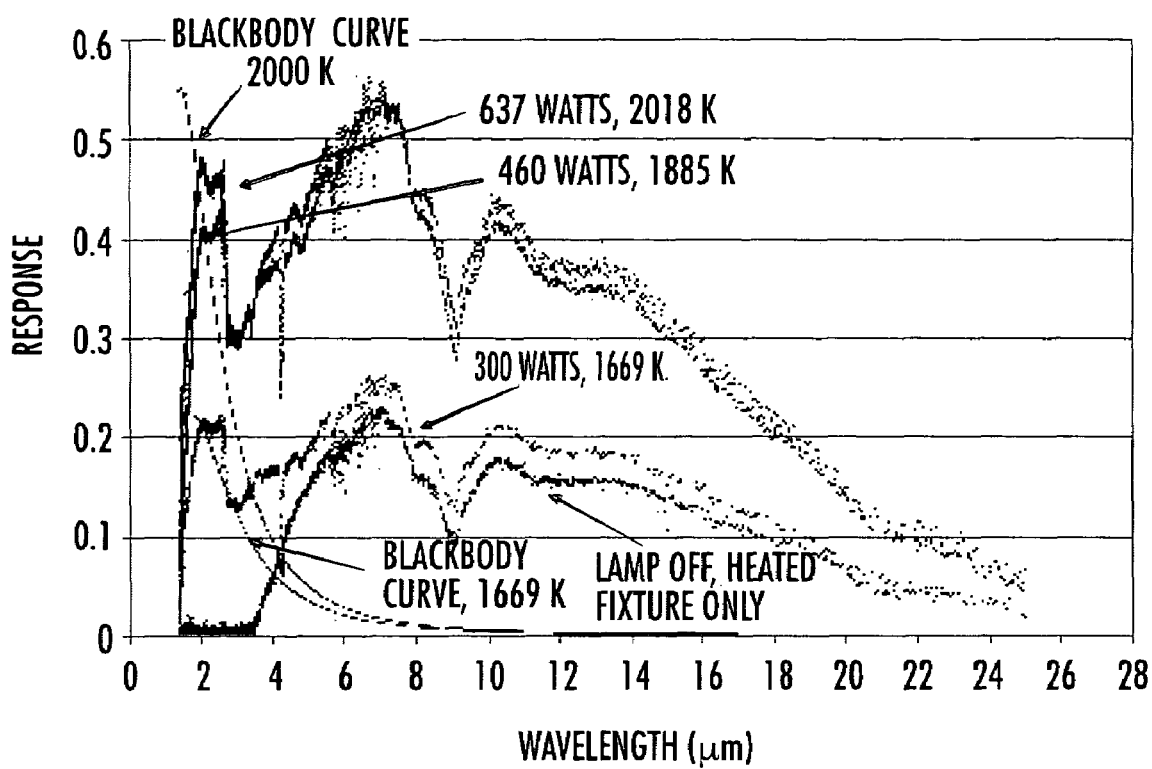
FIG. 8 is a graph of a Fourier transform of emissions spectra from a short wavelength radiant heating system at 637 W (2018° K.), 460 W (1885° K.), 300 W (1669° K.), and for a lamp that is deactivated. A theoretical blackbody radiation curve at 2000° K. and at 1669° K. is also shown.
Figure 9:
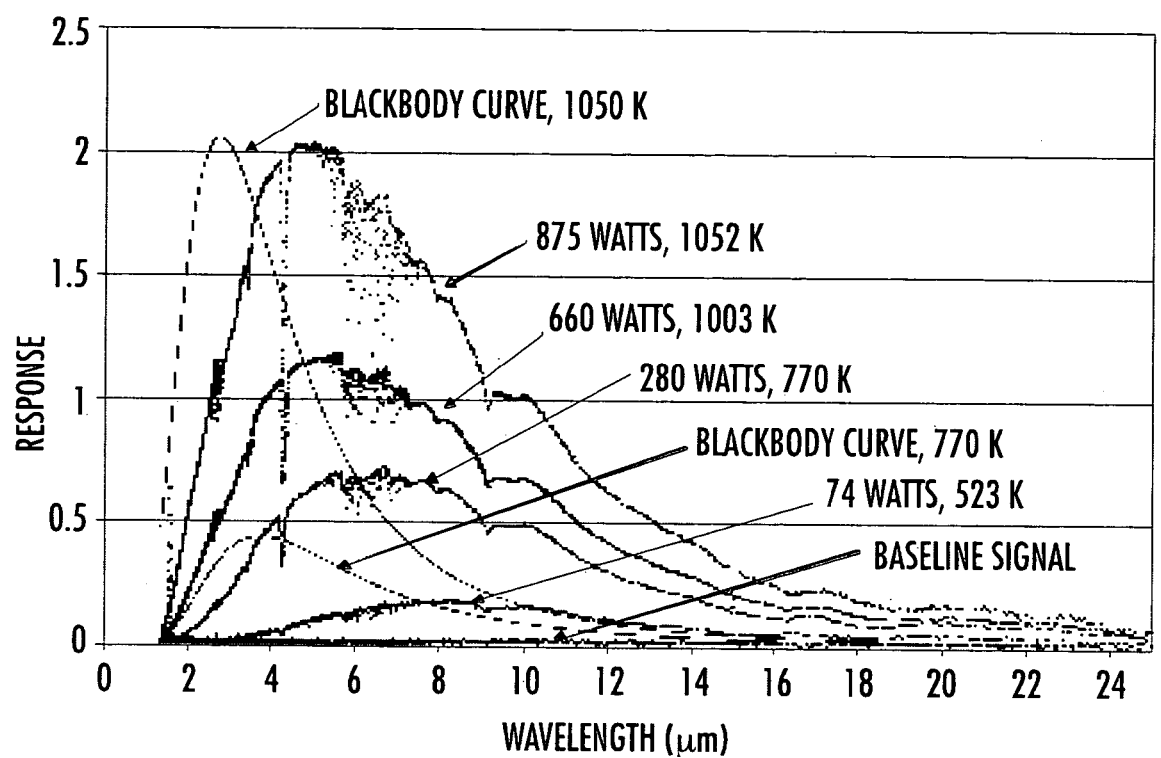
FIG. 9 is a graph of a Fourier transform of emissions spectra from a medium wavelength radiant heating system at several power levels with corresponding theoretical blackbody radiation curves.
Figure 10:
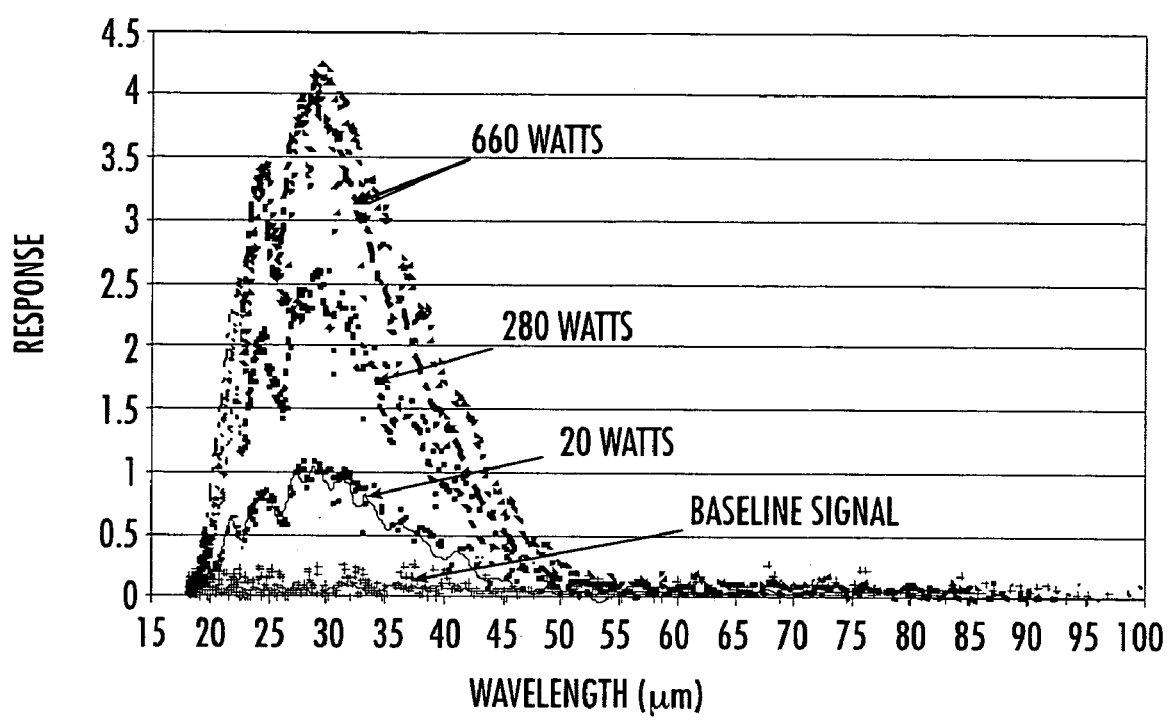
FIG. 10 is a graph of a Fourier transform of emissions spectra for a medium wavelength radiant heating system at several power levels for the wavelength range of 30 to 100 μm.

The wavelengths of the electromagnetic radiation emitted by the emitters 20A-20F and 22A-22D can also be controlled, for example, by adjusting the power level to the emitters 20A-20F and 22A-22D or by selecting emitters having an appropriate wavelength. Without wishing to be bound by any particular theory, the frequency of the emitted radiation is a function of the temperature of the emitter, which, in turn, is proportional to the emitter power. The frequency distribution of the emitted radiation can be modeled according to blackbody radiation and calculated or estimated by equations relevant to blackbody radiation, for example, Planck's equation:

$$u(\lambda) = \frac{8\pi hc\lambda^{-5}}{e^{hc/\lambda kT} - 1}$$

where λ is the wavelength, T is the temperature in degrees Kelvin, h is Planck's constant, k is Boltzmnann's constant, and c is the speed of light. The wavelength and temperatures of exemplary emitters and theoretical blackbody emissions are illustrated in FIGS. 8-10. Additional radiation theory is discussed in Lloyd, B. J., Farkas, B. E. and Keener, K. M. "Characterization of Radiant Emitters used in Food Processing." *Int. J. of Microwave Power and Electromagnetic Energy*. (Accepted for Publication 2004), the disclosure of which is hereby incorporated by reference as if fully set forth herein. Short wavelength emitters, such as quartz halogen emitters and incandescent lamps, typically have temperatures between about 1900° C. to about 3000° C. Medium wavelength emitters, such as metal sheaths and nickel chromium wires typically have temperatures between about 900° C. to about 1800° C.

As illustrated in FIGS. 8-10, the frequency distribution emitted by an emitter can be controlled by adjusting the power (wattage) to the emitters 20A-20F and 22A-22D of FIGS. 1-4. Lower power generally results in relatively longer wavelength radiation, and higher power generally results in relatively shorter wavelength radiation. Longer wavelength radiation does not penetrate as deeply into a food product as shorter wavelength radiation. As would be understood by those of skill in the art, various filters and/or reflectors can also be used to produce a desired wavelength. For example, the emitter wavelengths can be between about 0.4 μm and about 100 μm and the heat flux can be between about 0 and 10 W/cm².

Accordingly, as shown in FIG. 1, a crust matrix oil the product 26 may be achieved by operating the surface-browning emitters 20A-20F in the heating zone 14A at a lower power than the interior-heating emitters 22A-22D in the heating zone 14B. The relatively lower power at which surface-browning emitters 20A-20F are operated can result in longer wavelength light, which heats the surface of the product 26 when the product is in the heating zone 14A. The longer wavelength radiation can result in the formation of a crust matrix. Moreover, the relatively short distance between the product 26 and the surface-browning emitters 20A-20F can result in a high heat flux relative to the interior-heating emitters 22A-22D. In this configuration, the surface-browning emitters 20A-20F can emit longer wavelength radiation and high heat flux to the product 26 in the heating zone 14A (to form a crust matrix) compared with shorter wavelength radiation and lower heat flux to the product 26 in the heating zone 14B (to heat the product interior). The speed of the conveyor belt 16 can be adjusted to expose the product 14 to a given wavelength and heat flux for a sufficient period of time to achieve desired results, such as a surface crust matrix, without burning and/or heating without over cooking.

The change in heat flux, power, frequency distribution and the like can be controlled along the conveyor to produce various results in preparing the food product 26. The changes in heat flux may be gradual or may have intervening increases and decreases between the heating zones 14A-14B. For example, as a food product 26 passes directly beneath or above one of the emitters 20A-20F and 22A-22D, the intensity of the radiation and heat flux will generally increase. Radiation from the emitters can also be controlled by selectively activating an emitter, for example, half the magnitude of heat flux may be achieved by setting an emitter to be on for three seconds and off for three seconds. In some embodiments according to the invention, a sensor can be sent along a conveyor, such as conveyor 18, to detect the heat flux and/or wavelength of the radiation at successive points along the conveyor. Various parameters, such as emitter distances, emitter powers, speed of the conveyor belt, and the like, can be adjusted to achieve desired food preparation characteristics. For example, to approximate immersion frying, parameters can be selected to produce high heat flux radiation followed by lower heat flux and radiation. The wavelength of the radiation can also be adjusted to control the penetration depth of the energy.

Although the oven 10 has been illustrated with respect to surface-browning emitters 20A-20F in heating zone 14A and interior-heating emitters 22A-22D in heating zone 14B, it should be understood that overlapping processes could occur in the heating zones 14A-14B. That is, some interior heating may occur in heating zone 14A and some surface evaporation may occur in heating zone 14B. Preferably, sufficient evaporation of surface moisture should occur in heating zone 14A prior to interior heating in heating zone 14B such that a crust matrix is produced. Thus, the processed food product 26 may have a crispy crust matrix exterior surface that is similar to the surface obtained through immersion frying processes.

Figure 11:
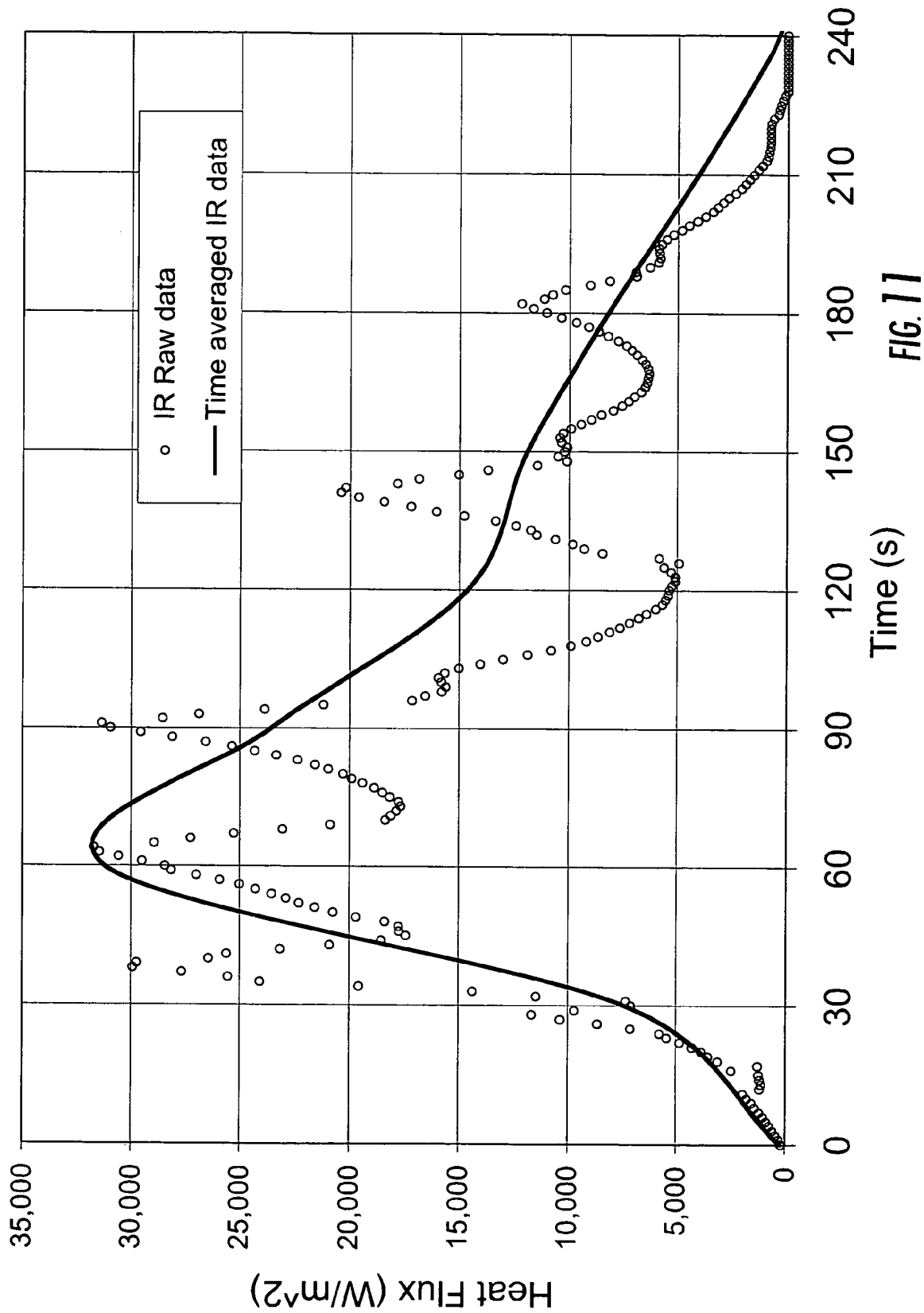
FIG. 11 is a graph of the raw infrared heat flux data measured by a sensor and the time-averaged sensor data along the length of the oven of FIG. 1.

FIG. 11 is an example of the heat flux as a function of time for an oven, such as the oven 10 shown in FIG. 1. As shown in FIG. 11, the measured heat flux may increase and decrease along the conveyor as time progresses. The fluctuations shown are the result of heat flux fluctuations as the sensor passes from one emitter to the next, and each emitter causes a spike in the sensed heat flux. However, the smoothed heat flux profile illustrates an initial increasing heat flux from about 0 to about 50 seconds followed by a decreasing heat flux. The measured heat flux from the sensor in FIG. 11 generally measures the heat flux substantially perpendicular to the conveyor belt. However, the food product 26 receives radiation on substantially all of its sides; therefore, the actual heat flux on the food product 26 more closely resembles the time-averaged curve. In some embodiments according to the invention, the heat flux increases to above about 2.5 W/cm² in about 75 seconds, 50 seconds or less. The formation of a crust matrix on a surface of the product can have a duration of about 300 seconds, and in some embodiments, the crust matrix can be formed in about 60 seconds, 10 seconds or less, depending on the product composition, size, and initial temperature. For example, a longer heating time or a separate defrost cycle can be used to cook frozen food products. The entire cooking process for both the exterior and the interior of the food product 26 can be between about 5 and 300 seconds.

In some embodiments, a preheating zone can be used to preheat a product, such as a frozen product. The preheating zone can include electromagnetic radiation configured to provide a low intensity heat flux, such as less than 1.0 W/cm² to 0.1 W/cm².

The positions of the emitters can be selected, for example, based on the food product, composition, initial temperature, and the like. In some embodiments, the distance between the emitters 20A-20F and 22A-22D and the surface of the conveyor 18 is between about 1.5 inches and about 3.0 inches. In particular embodiments, the distance between the emitters 20A-20F and 22A-22D and the surface of the conveyor 18 is as follows: 1.5 inches between emitters 20A and 20D and the conveyor 18; 2 inches between emitters 20B and 20E and the conveyor 18; 2.25 inches between emitters 20C and 20F and the conveyor 18; 2.5 inches between emitters 22A and 22C and the conveyor 18; 2.75 inches between emitters 22B and 22D and the conveyor 18. The distances between successive emitters are as follows: 4.5 inches between emitters 20A and 20B; 7.5 inches between 20B and 20C; 14 inches between 20C and 22A; and 18.5 inches between 22A and 22B. The same distances are used for the corresponding lower emitters 20D-20F and 22C-22D. The enclosed portion of the oven 10 is about 22 inches in length. The emitter distances can be adjusted manually or using a controller system.

In other embodiments, larger ovens can be used, for example, the distance between the emitters 20A-20F and 22A-22D and the surface of the conveyor 18 can be between 12 and 26 inches. The conveyor 18 can be 10, 50, 100, or 200 feet or more in length for large-scale production. The conveyor 18 may also be configured in a non-linear arrangement, such as a spiral.

Figure 5:
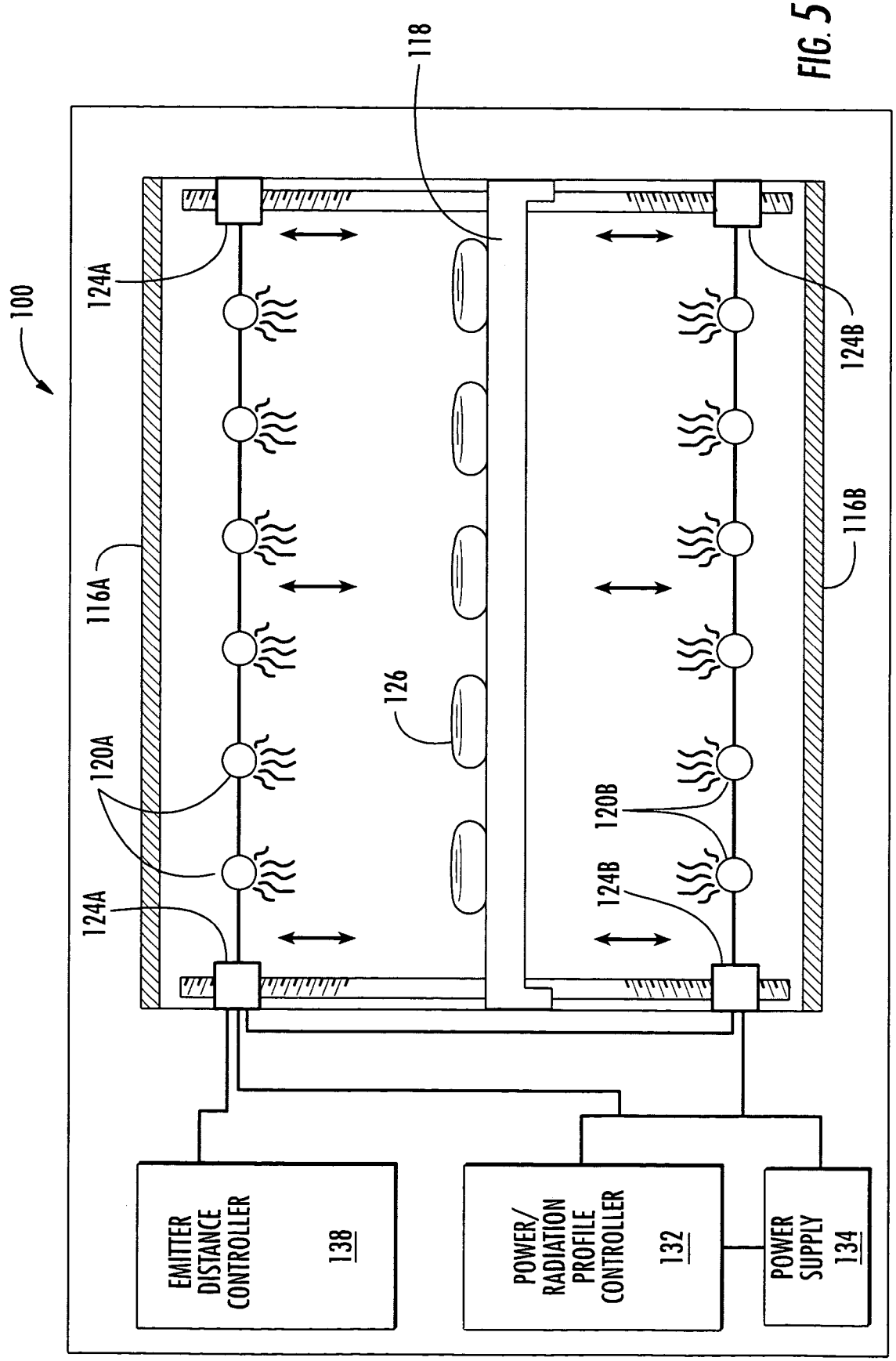
FIG. 5 is a cross-sectional view of a batch process oven according to further embodiments of the present invention.

Although the oven 10 in FIGS. 1-4 is illustrated with emitters 20A-20F and 22A-22D, other emitters and emitter configuration can be used. For example, emitters may be positioned on only one side of a conveyor belt or on all sides of the conveyor belt. As illustrated in FIG. 5, a batch process oven 100 can be used to produce food products according to embodiments of the invention. The oven 100 includes upper emitters 120A and lower emitters 120B The emitters 120A-120B are each connected to a positioning device 124A-124, respectively. The positioning devices 124A-124B move the emitters 120A-120B with respect to a food product 126 on a support 118, for example, during the cooking cycle.

The oven 100 also includes a power/radiation profile controller 132 that is connected to a power supply 134 for controlling the power to the emitters 120A-120B. An emitter distance controller 138 controls the positioning devices 124A-124B to control the distance between the emitters 120A-120B and the food product 126. Reflectors 116A-116B are provided to reflect radiant energy from the emitters 120A-120B toward the food product 126.

In this configuration, the power/radiation profile controller 132 can control the electromagnetic radiation profile from the emitters 120A-120B to the food product 126 by controlling the amount of power from the power supply 134 to the emitters 120A-120B. In addition, the emitter distance controller 138 and the positioning devices 124A-124B can control the electromagnetic radiation profile (such as the radiation intensity) by adjusting the distance between the emitters 120A-120B and the food product 126. For example, the emitter distance controller 138 can position the emitters 120A-120B using the positioning devices 124A-124B such that the emitters 120A-120B are closer to the food product 126 at the beginning of a cooking cycle to heat the surface of the food product 126. Preferably, moisture is evaporated from the surface of the food product 126 to result in a crust matrix exterior. Next, the emitter distance controller 138 can move the emitters 120A-120B farther from the food product 126 to heat the interior using less intense heat once the crust matrix is formed.

Figure 6:
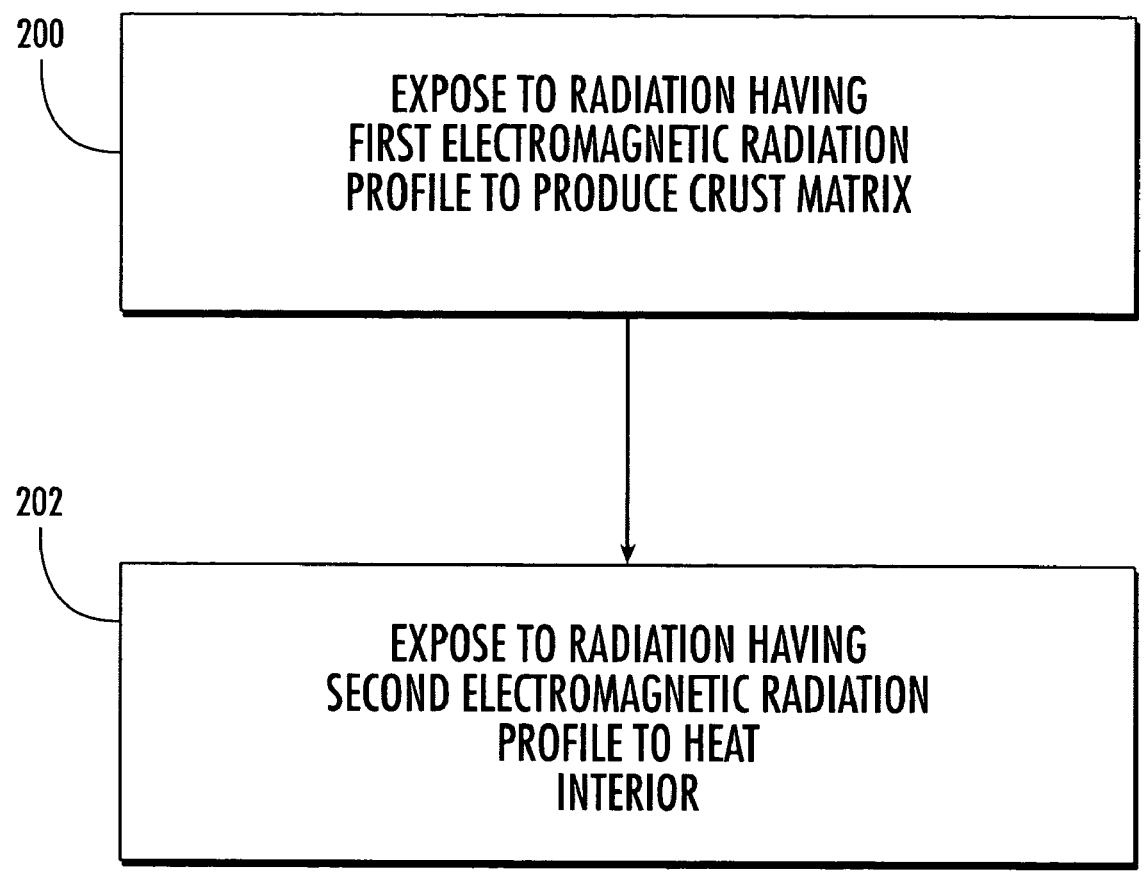
FIG. 6 is a flow chart of operations according to embodiments of the present invention.

As illustrated in FIG. 6, a food product is exposed to radiation having a first electromagnetic radiation profile to produce a crust matrix (Block 200). Then, the food product is exposed to radiation having a second electromagnetic radiation profile to heat the interior of the product (Block 202). Food products approximating immersion-fried food can be produced.

Any suitable emitter or emitter configuration can be used according to embodiments of the present invention. The emitters can be point source emitters, elongated emitters in a straight line, or elongated emitters in an arch shape. The emitters can be infrared emitters and, more preferably, quartz halogen emitters, such as commercially available 500 W quartz halogen emitters. Emitters having various wattages can be used, including 100 W emitters, emitters greater than 500 W, and two or more emitters joined in parallel arrangements. Metal sheath emitters, nickel-chromium wires, heated ceramic surfaces, and/or incandescent heaters can be used. The wavelengths of the electromagnetic radiation emitted by the emitters are typically between about 0.4 μm and 300 μm. Visible wavelength radiation can also be used, such as between 0.4 μm and 0.7 μm.

Moreover, various oven configurations may be used to achieve a desired prepared food product including batch or continuous oven configurations as described with respect to the continuous oven 10 of FIGS. 1-4 and the batch process oven 100 of FIG. 5. The distance of the food product to an emitter in either batch or continuous oven configurations can be controlled by a mechanical controlling mechanism such as an arm or lever. Ovens according to embodiments of the present invention can also be used in conjunction with other energy sources such as microwave radiation, convection, and the like.

Various food products can be used as starting product materials according to embodiments of the present invention, such as a par-fried food products (including meat and other muscle tissue, and/or potato products), frozen food products, fully-cooked food products, raw food products, and uncooked food products coated in an oil or other coating. For example, coating of the food product before or after processing may be used to enhance the taste and/or texture of a food product, for example, by controlling the moisture dissipation through the surface of the product. Other examples of food products that can be used include, vegetables, seafood, potato chips, tortilla chips, pasta or starch based foods, fruit, desserts, hors d'oeuvres, or any item that can be finish fried.

Embodiments of the present invention are described herein with reference to an initial high heat flux followed by a decreasing heat flux stage. However, the heat flux distribution can be controlled to obtain various heating and/or cooking profiles including an initial low heat flux followed by an increasing heat flux. The frequency of radiation can also be adjusted to obtain various profiles of energy penetration, for example, to heat the surface of a product before or after cooking the internal portion of the product. Electromagnetic radiation profiles according to embodiments of the present invention can also be used in combination with convection, conduction, and/or microwave heating techniques. Moreover, embodiments according to the present invention may be used in various applications including drying processes and curing processes, such as for plastic, paper, and/or chemical manufacturing.

Embodiments of the present invention will now be described with respect to the following non-limiting examples.

EXAMPLE 1

Without wishing to be bound by a particular theory, immersion frying may be characterized by four stages: 1) initial heating, 2) surface boiling, 3) falling rate, and 4) bubble end point. Radiant heat can be used to approximate the immersion frying process. Briefly, when a food product is immersed in frying oil, heat is initially transferred from the oil to the food by free convection and through the food by conduction with little water vaporization (stage 1). During stage 2 (surface boiling), moisture at the surface is suddenly lost, which increases surface heat transfer and results in crust formation. Stage 3 (falling rate) is characterized by decreased heat transfer and a steady decrease in vapor mass transfer from the food product. The bubble end point (stage 4) can be characterized by the apparent cessation of moisture loss from the food during frying. Heat transfer characteristics during immersion frying are discussed in Hubbard, L. J. and B. E. Farkas. 1999. *A method for determining the convective heat transfer coefficient during immersion frying. J. of Food Process Engr*. 22: 201-214, the disclosure of which is hereby incorporated by reference as if fully set forth herein.

Radiant heating utilizes electromagnetic energy in the visible, near, and/or far infrared wavelength regions. As discussed herein, electric radiant emitter sources allow control of power level, incident radiation intensity, and spectral distribution, all of which affect product heating rates and temperature profiles. Accordingly, radiant heat emitters can be used to approximate the heat transfer of immersion frying.

Radiant heating of food products may be studied and/or mathematical models used to simulate temperature change as a function of heat flux and material spectral properties. Process parameters, including spectral properties of food materials and spectral wavelength emissions from radiant emitter sources, may be used in simulating radiant heating of foods. Such process parameters may be used to provide radiant heating of a product that can simulate an immersion frying process. For example, some mathematical models for radiant heating of foods are a constant radiant heat flux upon one-dimensional flat surfaces. Two-dimensional mathematical models of the internal temperature profile of a food product, such as a French fry, may provide additional information. Mathematical modeling and/or experimental information, for example, of a food product during an immersion fat frying process and/or of the food product during radiant heating, may be used to set process parameters of radiant heating systems to produce a food product with some of the characteristics of an immersion-fried product.

For example, the explicit finite difference method may be used for a solution of the transport equations. Temperature distributions can be calculated for a particular shape, such as a square two-dimensional parallelepiped simulation of a shoestring cut French fry. Radiant energy may be assumed incident upon the food surface uniformly, which neglects shape factor considerations between the radiant emitter and the food product surface. Penetration of radiant energy within the food material surface may be assumed to have an exponential decay following Beer's Law. Heat transfer equations can include an internal generation term for absorbed radiant energy as well as conduction and convection heat transfer terms. Simulations may be carried out for both steady and unsteady state heat flux conditions. Experimental data may be collected so that simulated temperature profiles for radiant heating of a product, such as a shoestring French fry, can be calculated and compared with experimental data. Input variables that may impact on output can include radiant energy surface reflection and internal dissipation coefficients. The simulation may serve as a tool for determination of the heating effects of radiant processing parameters and material temperature profiles. Manipulation of model input variables, such as radiant intensity spectral distribution, and food composition, may be done to optimize product heating.

As described herein, electronically controlled radiant emitters may be used to reproduce heat flux profiles that occur during immersion frying. Drying rates, and core and surface temperatures of par-fried products, such as French fries, may be measured during radiant heating to reproduce immersion frying heat transfer. Heat flux measurements may be recorded through the oven using a water-cooled radiometer and used to approximate immersion frying product results.

EXAMPLE 2

Commercially available frozen par-fried potato strips are obtained for reheating with finish fried-like quality. The par-fries have a bulk moisture content of about 60 to 70%. The initial oil content of 6 to 20%. The par-fried potato, or other par-fried potato material, may be standard shoestring cut, steak-cut, crinkle cut, regular-cut, or other any size with variable oven configurations of emitter power and vertical and horizontal spacing preset for optimal heat flux for fried-like reheating based on material dimensions and initial temperature. A shoestring cut frozen par-fried potato is heated in the variable heat flux oven for approximately 3 minutes or less. The surface crust color was virtually identical to high-quality freshly immersion-fried French fries based on visual observation and instrumental measurements using a digital image analysis of lightness, luminosity, and Hunter b-value. Par-fried French fries heated using this invention were compared with traditional finish frying methods summarized in Table 1. The final color of the radiant heated French fries had equivalent luminosity and yellowness (Hunter b-value) as traditionally finished fried French fries.

TABLE 1

Color comparison of French fries prepared by three different finish heating methods. Like letters in each column indicate that there was not a significant difference ($p < 0.05$) between means.

| Heat Treatment | Degree of Crust Darkening Luminosity | Yellowness Hunter b-value |
|---|---|---|
| Uncooked par-fried | 203.4[a] | 145.0[a] |
| Immersion-fried | 172.8[b] | 172.0[b] |
| Oven Baked | 172.6[b] | 178.2[c] |
| Radiant Heated | 177.7[b] | 171.1[b] |

The texture of par-fried French fries heated using the oven 10 of FIGS. 1-4 was measured by instrumental analysis using a TA.TX2 Texture Analyzer immediately after radiant finish frying. The results were compared with other traditional finish heating methods summarized in Table 2. The radiant heated product showed superior crisp texture compared to the traditionally finished fried French fries.

TABLE 2

Texture comparison of French fries prepared using three different heating methods. Like letters in each column indicate that there was not a significant difference (p < 0.05) between means.

|  | Punch test (N) | | Kramer shear (N) | |
|---|---|---|---|---|
| Heat Treatment | Mean (N) | Stnd. dev. | Mean (N) | Stnd. dev. |
| Immersion-fried | 0.521[a] | 0.245 | 21.3[a] | 6.54 |
| Oven Baked | 0.573[a] | 0.302 | 20.0[a] | 4.91 |
| Radiant Heated | 0.604[a] | 0.199 | 24.5[b] | 4.71 |

Sensory evaluation of par-fried French fries heated by this invention was completed using 53 consumers measuring various attributes using 0 to 9 hedonic scoring. The radiant heated par-fried French fries scored equivalent acceptance as traditional immersion-fried French fries.

TABLE 3

Mean hedonic scores for par-fried French fries heated using different finishing heat treatments. Like letters in each row indicate that there was not a significant difference (p < 0.05) between means.

| | Immersion-fried | | Oven Baked | | Radiant Heated | |
|---|---|---|---|---|---|---|
| Attribute | mean | stnd dev. | mean | stnd dev. | mean | stnd dev. |
| Overall Acceptability | 5.94[a] | 1.82 | 5.33[b] | 1.87 | 5.67[a] | 1.48 |
| Overall Appearance Liking | 6.30[a] | 1.38 | 6.00[a] | 1.74 | 5.92[a] | 1.53 |
| Overall Flavor Liking | 5.45[a] | 2.28 | 5.23[a] | 1.90 | 5.56[a] | 1.64 |
| Overall Texture Liking | 5.89[a] | 1.89 | 5.67[ab] | 2.01 | 5.19[a] | 1.83 |
| Overall Crispness Intensity | 5.28[a] | 2.09 | 5.00[ab] | 2.36 | 4.40[b] | 1.73 |
| Overall Crispness Liking | 5.53[a] | 2.03 | 5.19[ab] | 2.32 | 4.79[b] | 1.96 |
| Oily Mouthfeel Intensity | 5.49[a] | 1.75 | 4.83[b] | 1.78 | 4.10[c] | 1.80 |
| Oily Mouthfeel Liking | 5.49[a] | 1.84 | 5.52[a] | 1.80 | 5.90[a] | 1.52 |

(n = 53)

EXAMPLE 3

Room temperature, high quality, unglazed, par-fried yeast-risen or cake doughnuts are used as starting material for fried-like reheating. The starting doughnuts, or other fried dough material, may be standard size, mini-, or other any size with variable oven configuration preset for optimal surface heat flux for fried-like reheating based on material dimensions and initial temperature. The unglazed doughnuts previously received a full or partial initial frying in frying oil with a starting moisture content of about approximately 20 to 30%. The initial oil content of the unglazed par-fried doughnuts is about 10 to 18%. The room temperature unglazed doughnuts may be cooled, freshly fried up to staling age (approximately 7 days) and still be used as a starting material. The standard size, room temperature doughnuts are reheated with a variable heat flux oven in approximately 30 seconds. The surface crust temperature obtaining a temperature of about 165° C. and a center temperature reaching 80° C. at the central crumb portion. Surface crust color, crust texture, and crumb texture were all virtually identical to high-quality freshly immersion-fried doughnuts. The resulting hot doughnut is suitable for glazing and hot, freshly fried-like consumption.

EXAMPLE 4

Frozen, high quality, unglazed, par-fried yeast-risen or cake doughnuts are used as starting material for fried-like reheating. The starting doughnuts, or other fried dough material, may be standard size, mini-, or other any size with variable oven configuration preset for optimal surface heat flux for fried-like reheating based on material dimensions and initial temperature. The unglazed doughnuts previously received a full or partial initial frying in frying oil with a starting moisture content of about approximately 20 to 30%. The doughnuts may be frozen immediately after frying or prior to staling age. The initial oil content of the unglazed par-fried doughnuts is about 10 to 18%. The frozen unglazed doughnuts may be from freshly-fried, then frozen or up to staling, with the advantage of retardation of staling and fat migration. The standard size, frozen doughnuts are reheated with a variable heat flux oven in approximately 50 seconds. The surface crust temperature obtaining a temperature of about 130° C. and a center temperature reaching 70° C. at the central crumb portion. Surface crust color, crust texture, and crumb texture were all virtually identical to high-quality freshly immersion-fried doughnuts. The resulting hot doughnut is suitable for glazing and hot, freshly fried-like consumption.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A continuous oven for dynamically heating a food product having an outer surface and an interior, the oven comprising:
   an enclosure with a first heating zone and a second heating zone;
   a conveyor configured to convey the product from the first heating zone to the second heating zone;
   at least one surface-browning infrared emitter adjacent the first heating zone of the conveyor and configured to provide a first electromagnetic radiation profile to the product in the first heating zone that is adapted to evaporate surface moisture to produce a crust matrix on the outer surface of the product; and
   at least one interior-heating infrared emitter adjacent the second heating zone of the conveyor and configured to provide a second electromagnetic radiation profile to the product in the second heating zone that is different from the first electromagnetic radiation profile, wherein the second electromagnetic radiation profile is adapted to heat the interior of the product, the first electromagnetic radiation profile provides a greater heat flux to the product than the second electromagnetic radiation profile, and the first and second electromagnetic radiation profiles together approximate a heat flux characteristic of an immersion frying process.

2. The oven of claim 1, wherein a first distance between surface-browning infrared emitter and the conveyor is generally less than a second distance between the interior-heating infrared emitter and the conveyor.

3. The oven of claim 2, wherein the surface-browning infrared emitter and the interior-heating infrared emitter have substantially the same power level.

4. The oven of claim 1, further comprising an electromagnetic radiation profile controller configured to control a power level for the at least one surface-browning infrared emitter and the at least one interior-heating infrared emitter such that the power level of the at least one surface-browning emitter is greater than the power level of the at least one interior-heating emitter.

5. The oven of claim 1, wherein the at least one surface-browning infrared emitter and the at least one interior-heating infrared emitter comprise a first set of infrared emitters on one side of the conveyor and a second set of emitters on an opposing side of the conveyor.

6. The oven of claim 1, wherein the at least one surface-browning infrared emitter and the at least one interior-heating infrared emitter include quartz halogen emitters.

7. The oven of claim 1, wherein the at least one surface-browning infrared emitter and the at least one interior-heating infrared emitter also emit electromagnetic radiation in the visible to infrared wavelength range.

8. The oven of claim 1, wherein the at least one surface-browning infrared emitter and the at least one interior-heating infrared emitter emit electromagnetic radiation having a wavelength from between about 0.4 µm to about 300 µm.

9. The oven of claim 1, wherein the first electromagnetic radiation profile includes generally longer wavelengths than the second electromagnetic radiation profile.

10. The oven of claim 1, wherein the at least one surface-browning infrared emitter and the at least one interior-heating infrared emitter comprises a plurality of spaced apart infrared emitters, wherein the plurality of infrared emitters are configured to approximate a heat flux transfer as the product is transferred from the first heating zone to the second heating zone of the conveyor that approximates heat flux during immersion frying.

11. The oven of claim 1, wherein the at least one surface-browning infrared emitter is configured to provide a heat flux to the product in the first heating zone of the conveyor that increases to above about 1.5 W/cm$^2$.

12. The oven of claim 1, further comprising a controller configured to control the speed of the conveyor.

13. The oven of claim 1, wherein a distance between the at least one surface-browning infrared emitter or the at least one interior heating emitter and the conveyor is between about 1.5 inches and about 3.0 inches.

14. The oven of claim 1, wherein the at least one surface-browning infrared emitter and the at least one interior-heating infrared emitter comprise a plurality of spaced apart infrared emitters, and wherein a heat flux from successive ones of the plurality of infrared emitters generally increases in intensity in the first heating zone and generally decreases in intensity in the second heating zone.

15. A continuous oven for dynamically heating a food product having an outer surface and an interior, the oven comprising:

an enclosure with a first heating zone and a second heating zone;

a conveyor configured to convey the product from the first heating zone to the second heating zone;

at least one surface-browning infrared emitter adjacent the first heating zone of the conveyor and configured to provide a first electromagnetic radiation profile to the product in the first heating zone that is adapted to evaporate surface moisture to produce a crust matrix on the outer surface of the product; and at least one interior-heating infrared emitter adjacent the second heating zone of the conveyor and configured to provide a second electromagnetic radiation profile to the product in the second heating zone that is different from the first electromagnetic radiation profile, wherein the second electromagnetic radiation profile is adapted to heat the interior of the product, wherein the at least one surface-browning infrared emitter comprises a plurality of spaced apart surface-browning infrared emitters and wherein the at least one interior-heating infrared emitter comprises a plurality of spaced apart interior-heating infrared emitters, wherein a distance between successive ones of the plurality of surface-browning infrared emitters is generally shorter than a distance between successive ones of the plurality of interior-heating infrared emitters.

16. A continuous oven for dynamically heating a food product having an outer surface and an interior, the oven comprising:

an enclosure with a first heating zone and a second heating zone;

a conveyor configured to convey the product from the first heating zone to the second heating zone;

at least one surface-browning infrared emitter adjacent the first heating zone of the conveyor and configured to provide a first electromagnetic radiation profile to the product in the first heating zone that is adapted to evaporate surface moisture to produce a crust matrix on the outer surface of the product; and at least one interior-heating infrared emitter adjacent the second heating zone of the conveyor and configured to provide a second electromagnetic radiation profile to the product in the second heating zone that is different from the first electromagnetic radiation profile, wherein the second electromagnetic radiation profile is adapted to heat the interior of the product, wherein the at least one surface-browning infrared emitter and the at least one interior-heating infrared emitter comprise a plurality of spaced apart infrared emitters, and wherein the electromagnetic radiation from successive ones of the plurality of infrared emitters generally decreases in wavelength.

17. A method of dynamically heating a food product in an oven, the product comprising an exterior surface and an interior, the method comprising:

exposing the product to radiation having a first electromagnetic radiation profile adapted to produce a crust matrix on the surface of the product; and then exposing the product to radiation having a second electromagnetic radiation profile that is different from the first electromagnetic radiation profile and adapted to heat the interior of the product, wherein the first electromagnetic radiation profile has an intensity that is greater than the second electromagnetic radiation profile.

18. The method of claim 17, wherein the first electromagnetic radiation profile provides a heat flux to the product that is greater than about 1.5 W/cm$^2$ to provide a crust matrix on the surface of the product.

19. The method of claim 17, wherein the first electromagnetic radiation profile comprises longer wavelength radiation than the second electromagnetic radiation profile.

20. The method of claim 17, wherein the first electromagnetic radiation profile includes radiation having a wavelength between about 1.4 and 100 μm.

21. The method of claim 17, wherein the second electromagnetic radiation profile includes radiation having a wavelength between about 0.4 and 1.4 μm.

22. The method of claim 17, wherein the first electromagnetic radiation profile and the second electromagnetic radiation profile together approximates an immersion frying heat flux.

23. The method of claim 17, wherein exposing the product to the first electromagnetic radiation profile comprises exposing the product to an infrared emitter comprising a quartz halogen emitter.

24. The method of claim 17, wherein exposing the product to the first electromagnetic radiation profile has a duration of less than about 60 seconds.

25. The method of claim 17, further comprising conveying the product on a continuously advancing conveyor to expose the product to the first electromagnetic radiation profile and the second electromagnetic radiation profile.

26. The method of claim 17, wherein exposing the product to the first electromagnetic radiation profile and exposing the product to the second electromagnetic radiation profile comprises placing the product on the conveyor, wherein the oven includes a plurality of infrared emitters configured to produce a variable heat flux at successive points along the conveyor approximating a heat flux of an immersion frying process.

27. The method of claim 26, wherein the variable heat flux increases to above about 2.5 W/cm$^2$ in a duration of less than about 50 seconds.

28. The method of claim 17, wherein exposing the product to the first electromagnetic radiation profile and exposing the product to the second electromagnetic radiation profile are carried out in a batch process.

29. The method of claim 17, wherein the product before exposure to radiation is a par-fried potato piece.

30. The method of claim 17, wherein the product before exposure to radiation is a raw potato piece having oil on the surface.

31. The method of claim 17, wherein the product before exposure to radiation is a fried or par-fried breaded muscle tissue product.

32. The method of claim 17, wherein the product before exposure to radiation is a par-fried yeast-risen or cake doughnut.

33. The method of claim 17, wherein the product before exposure to radiation is at least partly frozen, the method further comprising:
exposing the product to a heat flux before the step of exposing the product to radiation having a first electromagnetic radiation profile, wherein the heat flux is adapted to defrost the product.

34. The method of claim 33, the step of exposing the product to a heat flux comprises exposing the product to a heat flux of between about 0.1 and 1 W/cm$^2$.

35. A method of dynamically heating a food product in an oven, the product comprising an exterior surface and an interior, the method comprising:
exposing the product to radiation having a first electromagnetic radiation profile adapted to produce a crust matrix on the surface of the product; and then
exposing the product to radiation having a second electromagnetic radiation profile that is different from the first electromagnetic radiation profile and adapted to heat the interior of the product, the method further comprising:
measuring the heat flux to the product during immersion frying; and
selecting the first and the second electromagnetic radiation profile based on the measured heat flux to the product during immersion frying.

36. An oven for dynamically heating a food product, the product comprising an exterior surface and an interior, the oven comprising:
at least one infrared emitter;
a heating zone adjacent the at least one infrared emitter, the at least one infrared emitter configured to emit electromagnetic radiation in the heating zone; and
a controller in communication with the at least one infrared emitter and configured to control the electromagnetic radiation from the at least one infrared emitter to provide a first electromagnetic radiation profile adapted to produce a crust matrix on the surface of the product and then to provide a second electromagnetic radiation profile that is different from the first electromagnetic radiation profile and adapted to heat an interior of the product.

37. The oven of claim 36, wherein the controller further comprises a positioning portion connected to the at least one infrared emitter, the positioning portion configured to move the at least one infrared emitter with respect to the heating zone, wherein the controller is configured to move the at least one infrared emitter to a first position to provide the first electromagnetic radiation profile and to a second position to provide the second electromagnetic radiation profile.

38. The oven of claim 36, wherein the controller is configured to increase a power level to the at least one infrared emitter to provide the first electromagnetic radiation profile and to decrease the power level to the at least one infrared emitter to provide the second electromagnetic radiation profile.

39. The oven of claim 38, wherein the at least one infrared emitter is stationary.

* * * * *